(12) United States Patent
Miyatake et al.

(10) Patent No.: US 9,972,860 B2
(45) Date of Patent: May 15, 2018

(54) BIPOLAR ELECTRODE AND BIPOLAR LITHIUM-ION SECONDARY BATTERY USING SAME

(71) Applicant: NISSAN MOTOR CO., LTD., Kanagawa (JP)

(72) Inventors: Kazuki Miyatake, Yokohama (JP); Yoshio Shimoida, Yokosuka (JP); Masanori Aoyagi, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 148 days.

(21) Appl. No.: 14/379,557

(22) PCT Filed: Feb. 13, 2013

(86) PCT No.: PCT/JP2013/053392
§ 371 (c)(1),
(2) Date: Aug. 19, 2014

(87) PCT Pub. No.: WO2013/125410
PCT Pub. Date: Aug. 29, 2013

(65) Prior Publication Data
US 2015/0017522 A1     Jan. 15, 2015

(30) Foreign Application Priority Data
Feb. 23, 2012  (JP) ................................. 2012-037956

(51) Int. Cl.
*H01M 4/13* (2010.01)
*H01M 10/04* (2006.01)
(Continued)

(52) U.S. Cl.
CPC ......... *H01M 10/0418* (2013.01); *H01M 4/13* (2013.01); *H01M 4/66* (2013.01);
(Continued)

(58) Field of Classification Search
None
See application file for complete search history.

(56) References Cited

U.S. PATENT DOCUMENTS

| 2008/0220330 A1 | 9/2008 | Hosaka et al. |
| 2011/0305948 A1 | 12/2011 | Miyatake et al. |
| 2013/0130107 A1 | 5/2013 | Uchida |

FOREIGN PATENT DOCUMENTS

| CN | 102349181 A | 2/2012 |
| JP | 2000331686 A | 11/2000 |

(Continued)

OTHER PUBLICATIONS

Communication and extended European search report dated Jan. 5, 2015 from the corresponding European Application No. 13751291.9.

*Primary Examiner* — Tracy Dove
(74) *Attorney, Agent, or Firm* — Young Basile Hanlon & MacFarlane, P.C.

(57) ABSTRACT

A bipolar electrode includes a collector; a positive electrode active material layer disposed on one surface of the collector; and a negative electrode active material layer disposed on the other surface of the collector. The quotient of the volume resistance of the collector and that of the positive and negative electrode active material layers is between $10^{-3}$ and $10^4$. The bipolar electrode further includes a current distribution relaxation layer having a volume resistivity lower than that of either the positive electrode active material layer or the negative electrode active material layer. At least one active material layer having a volume resistivity larger than that of the current distribution relaxation layer is disposed between the current distribution relaxation layer and the collector.

9 Claims, 4 Drawing Sheets

(51) Int. Cl.
*H01M 4/66* (2006.01)
*H01M 10/0525* (2010.01)
*H01M 4/02* (2006.01)

(52) U.S. Cl.
CPC .. *H01M 10/0525* (2013.01); *H01M 2004/029* (2013.01); *H01M 2220/20* (2013.01); *Y02T 10/7011* (2013.01)

(56) References Cited

FOREIGN PATENT DOCUMENTS

| | | | |
|---|---|---|---|
| JP | 2006-190649 | A | 7/2006 |
| JP | 2008097879 | A | 4/2008 |
| JP | 2010-251159 | A | 11/2010 |
| JP | 2011-018585 | A | 1/2011 |
| JP | 2011-119156 | A | 6/2011 |
| WO | 2012017546 | A1 | 2/2012 |

BIPOLAR ELECTRODE AND BIPOLAR LITHIUM-ION SECONDARY BATTERY USING SAME

CROSS REFERENCE TO RELATED APPLICATION

The present application claims priority to Japanese Patent Application No. 2012-037956, filed Feb. 23, 2012, incorporated herein in its entirety.

TECHNICAL FIELD

The present invention relates to a bipolar electrode and a bipolar lithium-ion secondary battery using the same.

BACKGROUND

Recently, from the viewpoint of environment and fuel economy, hybrid electric vehicles (HEV), electric vehicles (EV) and fuel cell vehicles have been manufactured and commercialized, and undergoing further developments. These electrically powered vehicles absolutely require the utilization of a dischargeable and chargeable power supply. As the power supply, there are utilized a secondary battery e.g. a lithium-ion battery and a nickel-hydrogen battery, an electric double-layer capacitor and the like. Particularly, the lithium-ion battery is considered to be suitable for electrically powered vehicles because of its high energy density and high durability to repeated charge and discharge, and therefore developments thereof are variously and eagerly being made. However, when applying the lithium-ion battery to a power supply for powering motors of the above-mentioned various kinds of automotive vehicles, it is necessary to use two or more secondary batteries electrically connected in series in order to ensure a sufficiently large output power.

However, when batteries are connected through an external electrical connection, the output power is decreased due to the electrical resistance of the electrical connection. Furthermore, batteries having an electrical connection are spatially disadvantageous. In other words, due to the presence of the electrical connection, decreases in output power density and energy density of the batteries are brought about.

For the purpose of solving the above problems, there has been developed a bipolar lithium-ion secondary battery such as a bipolar lithium-ion secondary battery. The lithium-ion secondary battery is provided to have a power generation element formed by laminating a bipolar electrode two or more times through an electrolyte layer and a separator, the bipolar electrode being composed of a collector having on its one surface a positive electrode active material layer and on its another surface a negative electrode active material layer.

In order to ensure a greater output power density, the collector thus used in the bipolar lithium-ion secondary battery is preferably formed of a material which is lightweight and excellent in electrical conductivity. In view of this, it has recently been proposed to use as a material for a collector (a resinous collector) a polymer material to which an electrically conductive material is added. For example, in Japanese Patent Application Publication No. 2006-190649, a resinous collector obtained by mixing a polymer material with an electrically conductive material such as metal particles and carbon particles is disclosed.

However, the resinous collector as disclosed in Japanese Patent Application Publication No. 2006-190649 is high in resistivity in the surface direction and therefore the variability in electric current distribution is caused in the surface of the active material layer (at the time of charge and discharge) to locally make an overcharged region, so that there are some cases where the deterioration of the electrode is accelerated thereby.

In view of the above, an object of the present invention is to provide a bipolar electrode the deterioration of which can be suppressed.

SUMMARY

The present invention is characterized in that, in a bipolar electrode including a collector and positive and negative electrode active material layers formed respectively on both sides of the collector, a current distribution relaxation layer having a volume resistivity lower than that of an active material layer is disposed on the side of the active material layer.

According to the present invention, even in the case of using a collector higher in resistance than a metal collector, an electric current can flow in the active material layer through the current distribution relaxation layer so that the current distribution in the active material layer is reduced, thereby suppressing the deterioration of the electrode.

DETAILED DESCRIPTION OF THE EMBODIMENTS

Referring now to the accompanying drawings, preferable embodiments of the present invention will be discussed; however, the technical scope of the invention should be defined with reference to the claims and therefore not limited to the embodiments as will be discussed below. Incidentally, throughout explanations about the drawings, the same element is given the same reference numeral and redundant explanations are omitted. Moreover, dimensional ratios in the drawings may be overcharged and therefore sometimes different from the actual ones.

<Bipolar Electrode>

Figure 1:
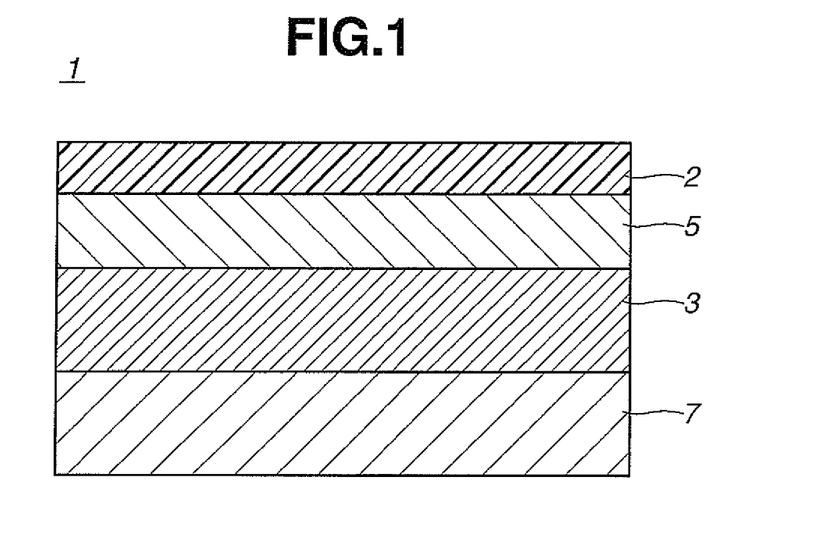
FIG. 1 is a cross-sectional view schematically showing the entire structure of a bipolar electrode according to a first embodiment of the present invention.

FIG. 1 is a cross-sectional view schematically showing the entire structure of a bipolar electrode according to a first embodiment of the present invention (hereinafter referred to as a first embodiment). Bipolar electrode 1 of the first embodiment has a laminated structure wherein positive electrode active material layer 5 is disposed on one surface of collector 3 and negative electrode active material layer 7 is disposed on the other surface of collector 3. Furthermore, bipolar electrode 1 has a structure wherein current distribution relaxation layer 2 is laminated on positive electrode active material layer 5. In other words, current distribution relaxation layer 2 is disposed on a surface of bipolar electrode 1, the surface being on the side opposite to collector 3 with respect to positive electrode active material layer 5 (in the thickness direction). By the way, a condition of electrode where "a current distribution relaxation layer is disposed on a surface of a bipolar electrode" means an embodiment not including other structural element on the surface of the current distribution relaxation layer which side is opposite to the side of active material layers in the thickness direction of the current distribution relaxation layer. Additionally, in the first embodiment, the volume resistivity of current distribution relaxation layer 2 is smaller than that of positive electrode active material layer 5 that resides at a lower portion. Incidentally, "there is at least one active material layer between the current distribution relaxation layer and the collector" means a configuration where the active material layer is supported by the current distribution relaxation layer and the collector therebetween. As such a configuration, it is possible to cite a configuration in which a current distribution relaxation layer is disposed on the surface of an active material layer as shown in the first embodiment (or a configuration obtained by laminating a collector, an active material layer and a current distribution relaxation layer in this order). In addition, it is also possible to cite a configuration where a current distribution relaxation layer is disposed inside an active material layer, and more specifically, a configuration where a current distribution relaxation layer is supported by active material layers therebetween as discussed in a second embodiment (or a configuration where a collector, an active material layer, a current distribution relaxation layer and an active material layer are laminated in this order). When considering the effects of the present invention, it will be understood that a configuration where a current distribution relaxation layer is disposed between a collector and an active material layer, i.e. a configuration where a current distribution relaxation layer is disposed on the same side as a collector is located with respect to an active material layer is excluded.

Figure 2:
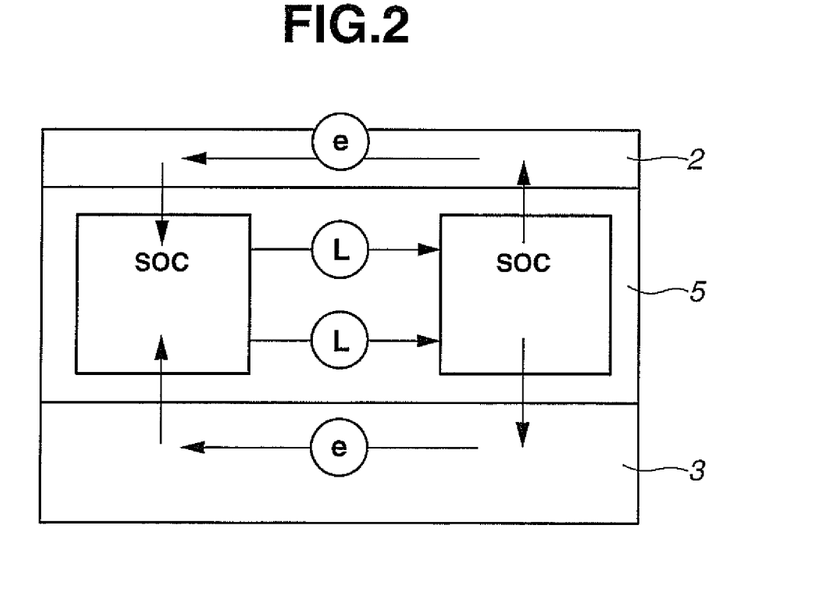
FIG. 2 is a cross-sectional view schematically showing a current distribution in the first embodiment.

A collector having a relatively high resistivity as compared with a metal collector, e.g. a resinous collector containing a conductive material is high in volume resistivity in the surface direction and therefore the electric current has difficulty in flowing in the surface of the collector. When variability in electric charge distribution is caused in the active material layer, the variability is therefore difficult to solve. Particularly in an electrode surface portion where a current path is long, the variability in electric charge distribution becomes more difficult to solve. If a battery repeats charge and discharge without easing such electric charge variability, overcharge and overdischarge are locally caused to develop degradation of the electrode, thereby leaving a fear of shortening the battery life. FIG. 2 is a cross-sectional view schematically showing a current distribution in this embodiment of the bipolar electrode. By disposing current distribution relaxation layer 2, an electric current becomes able to flow through current distribution relaxation layer 2 the resistance of which is low, and the variability of current distribution in active material layer 5 is reduced. Particularly by disposing a current distribution relaxation layer on a positive electrode active material layer (having difficulty in solving the variability of electric charge distribution) on the side opposite to a collector as in the present embodiment, the durability of the electrode is more greatly improved.

In the present embodiment of the bipolar electrode, the following effects are exhibited.

i) The durability of the electrode is enhanced. It is assumed that, when variability in electric charge distribution is caused in the active material layer, an electric current flows through the current distribution relaxation layer the resistance of which is low so as to ease the variability thereby suppressing local overcharge and discharge.

ii) By disposing the current distribution relaxation layer on the surface of the electrode, the durability of the electrode is more enhanced. Since the electrode surface is a portion where variability in electric charge distribution is most difficult to ease so that the variability is liable to occur, it is assumed that, by disposing the current distribution relaxation layer on the surface of the electrode, the effects of the current distribution relaxation layer are remarkably produced.

iii) By disposing the current distribution relaxation layer on the positive electrode active material layer, the durability of the electrode is further enhanced. Since the positive electrode active material layer having larger electrode resistance is more liable to cause variability in electric charge distribution and becomes more easily deteriorated, it is assumed that, by disposing the current distribution relaxation layer on the positive electrode active material layer, the effects of the current distribution relaxation layer are remarkably exhibited.

Figure 3:
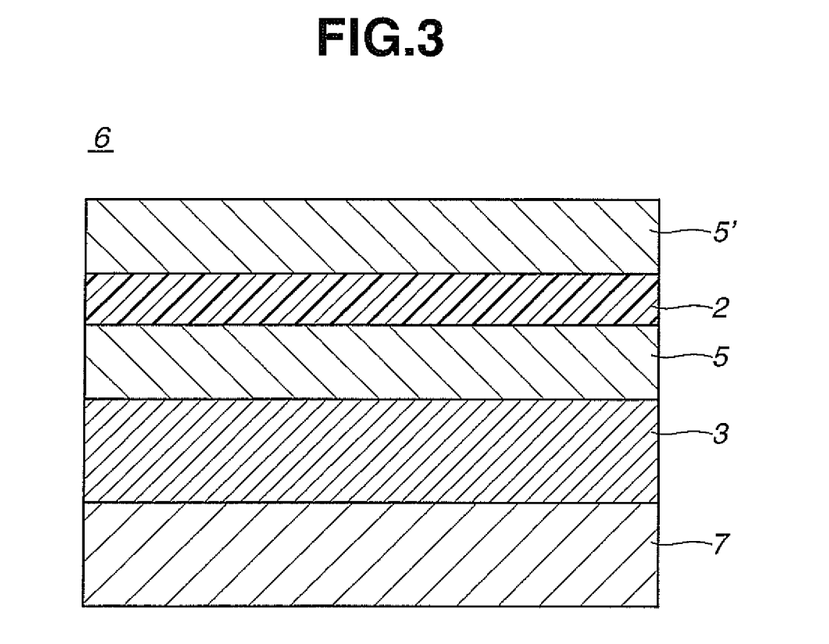
FIG. 3 is a cross-sectional view schematically showing the entire structure of the bipolar electrode according to another embodiment of the present invention.

FIG. 3 is a cross-sectional view schematically showing the entire structure of a bipolar electrode according to another embodiment of the present invention (hereinafter referred to as a second embodiment).

Bipolar electrode 6 of the second embodiment has a laminated structure where positive electrode active material layer 5 is formed on one surface of collector 3 and negative electrode active material layer 7 is formed on the other surface of the same. Furthermore, in bipolar electrode 6, current distribution relaxation layer 2 is disposed between two positive electrode active material layers 5 and 5' while positive electrode active material layer 5 is disposed between collector 3 and current distribution relaxation layer 2. In bipolar electrode 6 of the second embodiment, current distribution relaxation layer 2 is not disposed on the surface of bipolar electrode 6. In the second embodiment, the volume resistivity of current distribution relaxation layer 2 is lower than the volume resistivity of positive electrode active material layer 5 that resides at a lower portion. Such an embodiment is also preferable because a deterioration of positive electrode active material layer 5 located between collector 3 and current distribution relaxation layer 2 is suppressed.

Hereinafter, main structural elements of a bipolar electrode will be discussed.

[Current Distribution Relaxation Layer]

So long as a current distribution relaxation layer has a volume resistivity smaller than that of an active material layer that resides between the current distribution relaxation layer and a collector, the current distribution relaxation layer is allowed to be located on either of the side of a positive electrode active material layer or the side of a positive electrode active material layer, or may be located on both sides. The use of a low volume-resistivity material enhances an electric current flow. A preferable configuration is one where the current distribution relaxation layer exists at least on the side of the positive electrode active material layer, more preferably one where the current distribution relaxation layer exists only on the side of the positive electrode active material layer. A current distribution relaxation occurs antecedently on the side of an electrode having low resistivity, so that the side of an electrode having high resistivity tends to cause an electric current distribution particularly inside its surface. Hence it is preferable to dispose the current distribution relaxation layer on the side of the positive electrode active material layer having high resistivity. Since the current distribution relaxation layer is provided for the purpose of relaxing an electric current distribution to be generated when the collector and the active material layer are adjacent, at least one active material layer is present between the current distribution relaxation layer and the collector as discussed in the first and second embodiments. Additionally, "a current distribution relaxation layer is present on the side of a positive electrode active material layer" means a state where at least one positive electrode active material layer is present between the current distribution relaxation layer and the collector, and includes such a configuration as to dispose another positive electrode active material layer on the current distribution relaxation layer as in the second embodiment.

The volume resistivity (electric resistivity) of the current distribution relaxation layer in the thickness direction is less than the volume resistivity of an active material layer on which side the current distribution relaxation layer is disposed. In other words, the ratio of the volume resistivity of the current distribution relaxation layer to that of the active material layer on which side the current distribution relaxation layer is disposed is required only to be smaller than 1 and therefore not particularly limited. The ratio of the current distribution relaxation layer to the active material layer in volume resistivity is preferably $10^{-6}$ to 0.99, more preferably $10^{-5}$ to $10^{-2}$. In this specification, the volume resistivity means one in the thickness direction unless otherwise specified. The volume resistivity of the current distribution relaxation layer is not particularly limited but preferably not higher than $10^{-3}$ $\Omega \cdot cm$. In order to achieve the function of relaxing an electric current distribution in the active material layer, it is appropriate to let the current distribution relaxation layer have a volume resistivity of not higher than $10^{-3}$ $\Omega \cdot cm$. Though the volume resistivity is not particularly limited in lower limit, it is good enough in actual use if the volume resistivity is not smaller than $10^{-6}$ $\Omega \cdot cm$ because metal serving as a highly conductive material has a volume resistivity of not smaller than about $10^{-6}$ $\Omega \cdot cm$. In this specification, "volume resistivity" refers to a value calculated in the use of a sample obtained by applying a member to a PET sheet and cutting it into a 80 mm×50 mm square according to JIS K 7194 (1994).

The current distribution relaxation layer is not particularly limited but exemplified by layer formed containing: a metal thin layer or metal mesh formed of metal material; an electrically conductive filler such as metal particles or carbon particles; and a binder.

As metal material, it is possible to cite aluminium, nickel, iron, stainless steel, titanium, copper, gold and silver and an alloy of them. Among these materials, aluminium and stainless steel are preferable from the viewpoint of the electron conductivity and the battery action potential. A metal thin layer may be formed on the active material layer by physical vapor-phase growth method such as a sputtering method, a deposition method and an ion plating method. The thickness of the metal thin layer is preferably not larger than 5 μm, more preferably not larger than 1 to 1000 nm, much more preferably 3 to 500 nm, from the viewpoint of conductivity.

As a material that constitutes a metal foil having a mesh structure, the same materials as for the above-mentioned metal material are applicable. The thickness of the metal mesh is preferably 0.1 to 100 μm, more preferably 1 to 50 μm from the viewpoint of conductivity. Incidentally, the form of the mesh is not particularly limited and exemplified by a grid form, a triangularly meshed form, a honeycomb form and the like.

A material for the electrically conductive filler is not particularly limited so long as it is electrically conductive one. As a material excellent in electrical conductivity and potential tolerance, it is possible to cite a metal, an electrically conductive carbon and the like for example. The metal particles are not particularly limited but exemplified by aluminium, nickel, iron, stainless steel, titanium, copper, gold and silver and an alloy of them. Furthermore, the electrically conductive carbon is also not particularly limited but exemplified by acetylene black, Vulcan, Black Pearls, carbon nanofiber, Ketjenblack, carbon nanotube, carbon nanohorn, carbon nanoballoon and fullerene. The preferable examples are the electrically conductive filler and aluminium particles, and the more preferable example is the electrically conductive filler. The electrically conductive filler has quite a wide potential window, stable with respect to both positive electrode potential and negative electrode potential over a wide range, and excellent in electrical conductivity. Additionally, the carbon particles are so lightweight that an increase in mass is minimized. The carbon particles are used generally as an electric conducting additive for electrode, and therefore, even if brought into contact with these electric conducting additives, the contact resistance is extremely reduced because of being formed of the same material. Moreover, the electrically conductive filler may be such as to be obtained by coating the periphery of a particle-based ceramic material or a resinous material with an electrically conductive material by plating and the like.

The amount of the electrically conductive filler to be added may be suitably arranged so that it has a volume resistivity lower than that of the active material layer. More specifically, the content of the electrically conductive filler is preferably 30 to 99 mass %, more preferably 60 to 95 mass % relative to the total amount of the electrically conductive filler and the binder.

The average particle diameter of the electrically conductive filler is not particularly limited but it is generally several tens of nm to several tens of μm, preferably about 0.01 to 10 μm. Incidentally, in this specification, "the particle diameter" means a greatest length L between any two points on the circumference of a particle. In addition, "the average particle diameter" represents a value calculated with an observing means such as the scanning electron microscope (SEM) and the transmission electron microscope (TEM) as an average value of particle diameters of the particles observed in several to several tens of fields of view.

In the case of using the electrically conductive filler, a binder is used for binding the electrically conductive filler. Examples of the binder include polyethylene (PE; such as high-density polyethylene (HDPE) and low-density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF) and polystyrene (PS). These binders have high potential tolerance or solvent tolerance.

When the electrically conductive filler and binder are used for the current distribution relaxation layer, the thickness of the current distribution relaxation layer is preferably 0.1 to 100 μm, more preferably 1 to 50 μm.

In the case of using the electrically conductive filler and binder, examples of a method for producing the current distribution relaxation layer include a method where ingredients for the current distribution relaxation layer are dispersed and dissolved in a proper solvent to prepare a slurry and then apply it onto the active material layer, followed by drying. In this case the solvent is not particularly limited but it is possible to employ N-methyl-2-pyrrolidone (NMP), dimethylformamide, dimethylacetamide, methylformamide, cyclohexane, hexane, water and the like. When polyvinylidene fluoride (PVDF) is employed as the binder, it is preferable to use NMP as the solvent. As an application method, it is possible to cite spray coating, cast coating, dip coating, die coating and the like.

In the case of applying the bipolar electrode to a battery, the electron conductivity of the current distribution relaxation layer is preferably higher than the ion conductivity of an electrolyte contained in an electrolyte layer. If the electron conductivity of the current distribution relaxation layer is higher than the ion conductivity, it becomes possible to suppress the variability in electric charge distribution in the active material layer caused by the collector and it becomes possible to improve the durability, which is therefore preferable. The ratio of the ion conductivity of the electrolyte to the electron conductivity of the current distribution relaxation layer is preferably 0.99 to $10^{-8}$, more preferably $10^{-3}$ to $10^{-6}$. By the way, the electron conductivity of the current distribution relaxation layer corresponds to the reciprocal of the above-mentioned volume resistivity.

[Positive Electrode Active Material Layer]

Positive electrode active material layer 5 contains a positive electrode active material. The positive electrode active material has a composition capable of absorbing ions when the battery is discharged and releasing the ions when the battery is charged. As one preferable example, it is possible to cite a lithium-transition metal composite oxide, i.e., a composite oxide of lithium and a transition metal. More specifically, usable examples thereof are a lithium-cobalt composite oxide ($LiCoO_2$), a lithium-nickel composite oxide ($LiNiO_2$), a lithium-manganese composite oxide having a spinel structure ($LiMn_2O_4$), a lithium-iron composite oxide ($LiFeO_2$), an oxide in which a part of the transition metal is substituted with other elements, and the like. These lithium-transition metal composite oxides serve as a material excellently having reactivity and cycle property and low in cost. Accordingly, the use of these material for the electrode makes it possible to form a battery excellent in output characteristics. In addition, it is also possible to employ: a phosphate compound or sulfate compound containing lithium and a transition metal (such as $LiFePO_4$); an oxide or sulfite of transition metal (such as $V_2O_5$, $MnO_2$, $TiS_2$, $MoS_2$ and $MoO_3$); and $PbO_2$, AgO, NiOOH and the like. The positive electrode active material may be used singly or in combination of two or more kinds.

The average particle diameter of the positive electrode active material is not particularly limited but preferably 1 to 100 μm, more preferably 1 to 20 μm from the viewpoint of capacity enlargement, reactivity and cycle property. Within the above-mentioned range, a secondary battery is restrained from an increase of internal resistance of battery at the time of charge and discharge under high output conditions, so that it is possible to extract a sufficient current. Incidentally, when the positive electrode active material comprises secondary particles, it is preferable that primary particles constituting the secondary particles have an average particle diameter of 10 nm to 1 μm; however, the present invention is not necessarily limited to the above-mentioned range. It will be understood that the positive electrode active material is not necessarily such as to be formed into secondary particles by coagulation, agglomeration or the like, depending on the production method. As the particle diameter of the positive electrode active material and the particle diameter of the primary particles, a median diameter obtained by laser diffractometry can be used. A shape that the positive electrode active material may have differs according to the kind, production method etc. Possible examples thereof include a spherical (powdery) shape, a plate-like shape, a needle shape, a columnar shape and an angular shape; however, the positive electrode active material is not limited to these shapes and fits for use with no problem when it has any of the above-mentioned shapes. It is preferable to suitably select the best shape for enhancing battery characteristics including charge-discharge characteristics.

[Negative Electrode Active Material Layer]

Negative electrode active material layer 7 contains a negative electrode active material. The negative electrode active material has a composition capable of releasing ions when the battery is discharged and absorbing the ions when the battery is charged. The negative electrode active material is not particularly limited so long as it is such as to be able to absorb and release lithium reversibly; however, as a preferable example of the negative electrode active material, it is possible to cite a metal such as Si and Sn, a metal oxide such as TiO, $Ti_2O_3$, $TiO_2$, $SiO_2$, SiO and $SnO_2$, a lithium-transition metal composite oxide such as $Li_{4/3}Ti_{5/3}O_4$ and $Li_7MnN$, a lithium-metal alloy material such as Li—Pb alloy and Li—Al alloy, Li, and a carbon material such as graphite (e.g. natural graphite and artificial graphite), carbon black, activated carbon, carbon fiber, cokes, soft carbon and hard carbon.

Additionally, the negative electrode active material may contain an element which is to be alloyed with lithium. By using the element alloyed with lithium, it becomes possible to obtain a battery having higher capacity, greater energy density and superior output characteristic as compared with other carbon materials. The negative electrode active material may be used singly or in combination of two or more kinds. Though it is possible to concretely cite Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, Cl and the like, the element to be alloyed with lithium is not limited to the above. Among these, the negative electrode active material preferably contains the carbon material and/or at least one kind of selected from the group consisting of Si, Ge, Sn, Pb, Al, In and Zn and particularly preferably contains the carbon material and/or either one element of Si and Sn, from the viewpoint of capable of constituting a battery excellent in capacity and energy density. These may be used singly or in combination of two or more kinds.

The average particle diameter of the negative electrode active material is not particularly limited but preferably 1 to 100 μm, more preferably 1 to 20 μm from the viewpoint of capacity enlargement, reactivity and cycle property. Within the above-mentioned range, a secondary battery is restrained from an increase of internal resistance of battery at the time of charge and discharge under high output conditions, so that it is possible to extract a sufficient current. Incidentally, when the negative electrode active material comprises secondary particles, it is preferable that primary particles constituting the secondary particles have an average particle diameter of 10 nm to 1 μm; however, the present invention is not necessarily limited to the above-mentioned range. It will be understood that the negative electrode active material is not necessarily such as to be formed into secondary particles by coagulation, agglomeration or the like, depending on the production method. As the particle diameter of the negative electrode active material and the particle diameter of the primary particles, a median diameter obtained by laser diffractometry can be used. A shape that the negative electrode active material may have differs according to the kind, production method etc. Possible examples thereof include a spherical (powdery) shape, a plate-like shape, a needle shape, a columnar shape and an angular shape; however, the negative electrode active material is not limited to these shapes and fits for use with no problem when it has any of the above-mentioned shapes. It is preferable to suitably select the best shape for enhancing battery characteristics including charge-discharge characteristics.

The active material layer may contain other material as needed. For example, an electric conducting additive, a binder and the like may be contained. In the case where an ion conductive polymer is contained, a polymerization initiator may be added in order to cause polymerization of the polymer.

The electric conducting additive means an additive for improving the active material layer in electrical conductivity. Examples of the electric conducting additive are carbon particles such as acetylene black, carbon black, Ketjenblack and graphite, various carbon fibers including vapor-phase growth carbon fiber (VGCF; registered trademark), and expanded graphite. However, it will be understood that the electric conducting additive is not limited to the above examples.

The binder is exemplified by polyvinylidene fluoride (PVDF), PI, PTFE, SBR, a synthetic rubber-based binder etc.; however, it will be understood that the binder is not limited to these examples. Moreover, in the case where the binder and a matrix polymer to be used as a gel electrolyte are the same, it is not necessary to use the binder.

The mixture ratio of the components contained in the active material layer is not particularly limited. The mixture ratio may be suitably adjusted by referring to conventional knowledge about lithium-ion secondary batteries. The thickness of the active material layer is also not particularly limited and it is possible to determine it by suitably referring to conventional knowledge about lithium-ion secondary batteries. As an example, the thickness of the active material layer is preferably about 10 to 100 μm, more preferably about 20 to 50 μm. Only if the active material layer has a thickness of not smaller than about 10 μm, a sufficient battery capacity can be obtained. On the other hand, when the active material layer has a thickness of not larger than about 100 μm, the occurrence of a problem of an increase of internal resistance (caused when lithium ions becomes difficult to disperse into a depth portion (or toward the collector side) of the electrode) can be reduced.

A method for forming the positive electrode active material layer (or the negative electrode active material layer) on the surface of the collector is not particularly limited and therefore conventional methods are applicable. For example, as mentioned above, a positive electrode active material (or a negative electrode active material) is dispersed and dissolved in a proper solvent together with an as-needed electrolyte salt for improving the ion conductivity, an as-needed electric conducting additive for enhancing the electron conductivity and an as-needed binder, thereby preparing a positive electrode active material slurry (or a negative electrode active material slurry). The slurry is applied onto the collector and then dried in order to remove the solvent, followed by pressing it, thereby forming a positive electrode active material layer (or a negative electrode active material layer). In this case, the solvent is not particularly limited; however, applicable examples thereof are N-methyl-2-pyrrolidone (NMP), dimethylformamide, dimethylacetamide, methylformamide, cyclohexane, hexane, water and the like. When polyvinylidene fluoride (PVDF) is employed as the binder, it is preferable to use NMP as the solvent.

In the above-mentioned method, the positive electrode active material slurry (or the negative electrode active material slurry) is applied onto the collector and then dried, followed by pressing it. By adjusting press conditions at this time, it becomes possible to control the voidage in the positive electrode active material layer (or the negative electrode active material layer).

A concrete means for press treatment and press conditions are not particularly limited but these may be suitably adjusted so that the voidage in the positive electrode active material layer (or the negative electrode active material layer) reaches a desired value. A concrete form of the press treatment is exemplified by a hot press apparatus, a calendar roll press apparatus and the like. Furthermore, press conditions (e.g. temperature and pressure) are also not particularly limited and therefore determined by suitably referring to conventional knowledge.

[Collector]

Collector 3 of the bipolar electrode is provided to have a volume resistivity of $10^{-3}$ to $10^4$ relative to the positive and negative electrode active materials in the thickness direction. A collector falling within the above-mentioned range becomes relatively high in resistance and exhibits the effect of the current distribution relaxation layer. By the way, "a volume resistance ratio" is the ratio of the volume resistivity in the thickness direction of the collector ($\Omega \cdot cm$) to the volume resistivity in the thickness direction of the active material layer ($\Omega \cdot cm$). The volume resistance ratio is more preferably $3 \times 10^{-3}$ to 10. The volume resistivity of the collector is preferably $1 \times 10^{-7}$ to $1 \times 10^2$ $\Omega \cdot cm$, more preferably $1 \times 10^{-4}$ to $1 \times 10^2$ $\Omega \cdot cm$. From the viewpoint of the weight reduction, it is preferable that a resinous collector is used as the collector.

A material for constituting collector 3 is required only to be one having the above-mentioned volume resistance ratio and not particularly limited. Examples thereof include: a resin or alumina to which an electrically conductive filler is added; and a ceramic material consisting of the electrically conductive filler (identical to that contained in the resinous collector). Examples of the resin are an electrically conductive polymer material and a non-conductive polymer material.

Examples of the electrically conductive polymer material include polyaniline, polypyrrole, polythiophene, polyacetylene, polyparaphenylene, polyphenylene vinylene, polyacrylonitrile and polyoxadiazole. These electrically conductive polymer materials have an advantage in simplification of the manufacturing process and lightness of the collector, since these materials have sufficient electric conductivity even if the electrically conductive filler is not added thereto.

Examples of the non-conductive polymer material include polyolefin such as polyethylene (PE) (e.g. high-density polyethylene (HDPE) and low-density polyethylene (LDPE)) and polypropylene (PP), polyester such as polyethylene terephthalate (PET) and polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), epoxy resin and polystyrene (PS). These non-conductive polymer materials may have high potential tolerance or solvent tolerance.

To the electrically conductive polymer material and a non-conductive polymer material, the electrically conductive filler may be added as necessary. In particular, when the resin serving as a substrate of the collector only includes a non-conductive polymer, the electrically conductive filler is essential to provide the resin with electrical conductivity.

The electrically conductive filler is not particularly limited so long as it is electrically conductive one. As a material excellent in electrical conductivity, potential tolerance and lithium ion insulation, it is possible to cite a metal, an electrically conductive carbon and the like for example. The metal is not particularly limited but exemplified by aluminium, nickel, iron, stainless steel, titanium, copper, gold and silver and an alloy of them.

Furthermore, the electrically conductive carbon is also not particularly limited. However, it is preferable that the electrically conductive carbon contains at least one selected from the group consisting of acetylene black, Vulcan, Black Pearls, carbon nanofiber, Ketjenblack, carbon nanotube, carbon nanohorn, carbon nanoballoon and fullerene.

Of these, the electrically conductive carbon is preferably used as the electrically conductive filler. The electrically conductive filler has quite a wide potential window, stable with respect to both positive electrode potential and negative electrode potential over a wide range, and excellent in electrical conductivity. Additionally, the carbon particles are so lightweight that an increase in mass is minimized. The carbon particles are used generally as an electric conducting additive for electrode, and therefore, even if brought into contact with these electric conducting additives, the contact resistance is extremely reduced because of being formed of the same material.

The amount of the electrically conductive filler to be added is not particularly limited so long as it can impart a sufficient electrical conductivity to the collector. It is generally about 5 to 35 mass %.

The size of the collector may be determined depending on the intended use of the battery. For example, a collector having large areas is used for a large-size battery for which high energy density is required. The thickness of the collector is not particularly limited; however, the thickness is generally approximately 1 to 100 µm.

<Bipolar Lithium-Ion Secondary Battery>

Figure 4:
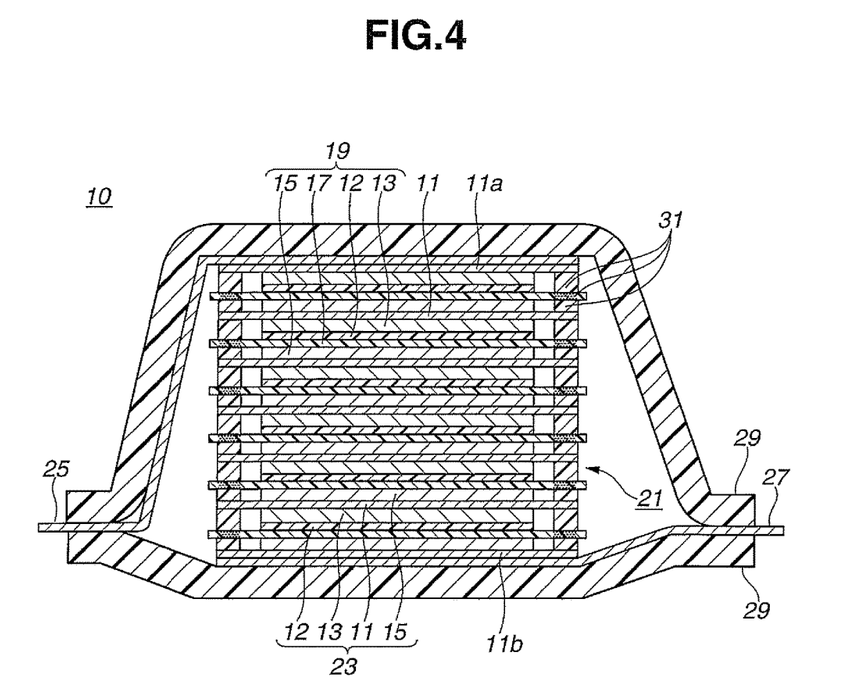
FIG. 4 is a cross-sectional view schematically showing a bipolar lithium-ion secondary battery according to the first embodiment of the present invention.

According to a first embodiment of the present invention, a bipolar lithium-ion secondary battery that has an electric generator element obtained by laminating the above-mentioned bipolar electrode 1 and an electrolyte layer is provided. FIG. 4 is a cross-sectional view schematically showing the entire structure of the first embodiment of the lithium ion secondary battery according to the embodiment of the present invention. Bipolar lithium-ion secondary battery 10 as shown in FIG. 4 has a structure where generally rectangular electric generator element 21 in which charge-discharge reaction actually progresses is sealed inside laminated film 29 serving as an exterior member of the battery.

As shown in FIG. 4, electric generator element 21 of bipolar lithium-ion secondary battery 10 of the present embodiment is provided to include two or more bipolar electrodes 23 (corresponding to bipolar electrode 1 in FIG. 1) each of which has positive electrode active material layer 13 formed on one surface of collector 11 (corresponding to collector 3 in FIG. 1 or 2) to be electrically connected thereto and negative electrode active material layer 15 formed on the other surface of collector 11 to be electrically connected thereto. Each of bipolar electrodes 23 is laminated through electrolyte layer 17 to construct electric generator element 21. Incidentally, electrolyte layer 17 has a configuration where a separator serving as a substrate holds an electrolyte at its center portion in the surface direction. Each of bipolar electrodes 23 and each of electrolyte layers 17 are laminated alternately in such a manner that positive electrode active material layer 13 of one bipolar electrode 23 and negative electrode active material layer 15 of other bipolar electrode 23 adjacent to the one bipolar electrode 23 face toward each other through electrolyte layer 17. In other words, electrolyte layer 17 is disposed to be sandwiched between positive electrode active material layer 13 of one bipolar electrode 23 and negative electrode active material layer 15 of other bipolar electrode 23 adjacent to the one bipolar electrode 23.

Positive electrode active material layer 13, electrolyte layer 17 and negative electrode active material layer 15 adjacent to each other constitute one single cell layer 19. Namely, bipolar lithium-ion secondary battery 10 has a constitution in which the plural single cell layers 19 are laminated. Additionally, for the purpose of preventing liquid junction due to leakage of an electrolyte solution from electrolyte layer 17, seal portion (or insulating layer) 31 is disposed along the periphery of single cell layer 19. Furthermore, only on one surface of positive electrode-side outermost collector 11a located at the outermost layer of electric generator element 21, positive electrode active material layer 13 is formed. Moreover, only on one surface of negative electrode-side outermost collector 11b located at the outermost layer of electric generator element 21, negative electrode active material layer 15 is formed.

In addition, in bipolar lithium-ion secondary battery 10 as shown in FIG. 4, positive electrode collecting plate 25 is disposed to be adjacent to positive electrode-side outermost collector 11a and extends to project from laminated film 29 that serves as an exterior member of the battery. On the other hand, negative electrode collecting plate 27 is disposed to be adjacent to negative electrode-side outermost collector 11b and extends to project from laminated film 29.

In bipolar lithium-ion secondary battery 10 as shown in FIG. 4, seal portion 31 is provided around each single cell layer 19 in most cases. This seal portion 31 is provided for the purpose of preventing contact between collectors 11 adjacent to each other in the battery and preventing a short circuit caused by some unevenness of end portions of single cell layers 19 in electric generator element 21. By disposing seal portion 31, it becomes possible to obtain bipolar lithium-ion secondary battery 10 the reliability and safety of which are ensured for a long period of time and the quality of which is fine.

The number of laminations of single cell layers 19 is adjusted according to a desired voltage. Since bipolar lithium-ion secondary battery 10 is required only to ensure a sufficient output even if the thickness of the battery is minimized as much as possible, the number of laminations of single cell layers 19 may be reduced. As bipolar lithium-ion secondary battery 10, one having such a construction that electric generator element 21 is sealed inside laminated film 29 (serving as an exterior member of the battery) under reduced pressure in order to prevent external impacts when using and environmental degradation and that positive electrode collecting plate 25 and negative electrode collecting plate 27 are taken outside laminated film 29 is preferable.

Hereinafter, main structural elements of a bipolar lithium-ion secondary battery will be discussed.

[Electrolyte Layer]

Electrolyte layer that constitutes an electrolyte layer is not particularly limited and it is possible to suitably use a liquid electrolyte and a polymer electrolyte such as a polymer gel electrolyte and polymer solid electrolyte and the like.

The liquid electrolyte is an electrolyte in which supporting salts (lithium salts) is dissolved in an organic solvent. Examples of the solvent include dimethyl carbonate (DMC), diethyl carbonate (DEC), dipropyl carbonate (DPC), ethyl methyl carbonate (EMC), methyl propionate (MP), methyl acetate, (MA), methyl formate (MF), 4-methyl dioxolane (4MeDOL), dioxolane (DOL), 2-methyltetrahydrofuran (2MeTHF), tetrahydrofuran (THF), Dimethoxyethane (DME), ethylene carbonate (EC), propylene carbonate (PC), butylene carbonate (BC), γ-butyrolactone (GBL) and the like. These solvents may be used singly or in combination of two or more kinds.

The supporting salts (lithium salts) are not particularly limited but exemplified by inorganic acid anionic salts such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, and LiSCN and organic acid anionic salts such as $LiCF_3SO_3$, $Li(CF_3SO_2)_2N$, LiBOB (Lithium bis(oxalate) borate) and LiBETI (lithium bis(perfluoroethylene sulfonylimide)); also referred to as $Li(C_2F_5SO_2)_2N)$. These electrolyte salts may be used singly or in combination of two or more kinds.

On the other hand, the polymer electrolyte is classified into a gel electrolyte containing an electrolyte solution, and a polymer solid electrolyte not containing the electrolyte solution. The gel electrolyte has a constitution where the above-mentioned liquid electrolyte is infused into a matrix polymer having lithium ion conductivity. Examples of the matrix polymer having lithium ion conductivity are a polymer including polyethylene oxide at its main chain or side chain (PEO), a polymer including polypropylene oxide at its main chain or side chain (PPO), polyethylene glycol (PEG), polyacrylonitrile (PAN), polymethacrylate, polyvinylidene fluoride (PVdF), a copolymer of polyvinylidene fluoride and hexafluoropropylene (PVdF-HFP), polyacrylonitrile (PAN), poly(methyl acrylate) (PMA), poly(methyl methacrylate) (PMMA), and the like. It is also possible to use a mixture, a degenerative, a derivative, a random copolymer, an alternating copolymer, a graft copolymer, a block copolymer etc. Of these, PEO, PPO and a copolymer of them, PVdF and PVdF-HFP are preferably employed. These matrix polymers are capable of well dissolving the electrolyte salts such as lithium salts therein.

In the case where the electrolyte layer is formed of the liquid electrolyte or the gel electrolyte, a separator may be used as the electrolyte layer. The separator is concretely in the form of a microporous film formed of polyolefin such as polyethylene and polypropylene, hydrocarbons such as a copolymer of polyvinylidene fluoride and hexafluoropropylene (PVdF-HFP) or glass fiber, for example.

The polymer solid electrolyte has a constitution where the supporting salts (lithium salts) are dissolved in the above-mentioned matrix polymer and does not contain an organic solvent serving as a plasticizer. Accordingly, in the case of the electrolyte layer consisting of the polymer solid electrolyte, there is no fear of liquid leakage and the reliability of the battery can be improved.

The matrix polymer for the polymer gel electrolyte and the solid polymer electrolyte can exhibit high mechanical strength when a cross-linked structure is formed. The cross-linked structure may be formed in a manner such that a polymerizable polymer used for polymer electrolyte formation (for example, PEO and PPO) is subjected to a polymerization treatment such as thermal polymerization, ultraviolet polymerization, radiation polymerization and electron beam polymerization, by use of an appropriate polymerization initiator. Incidentally, the above-mentioned electrolyte may be contained in an active material layer of an electrode.

[Seal Portion]

A seal portion (insulating layer) has the function of preventing contact between collectors and preventing a short circuit caused at end portions of single cell layers. A material for constituting the seal portion is required only to be one having: insulating property; sealability against a spill of the solid electrolyte; sealability (hermeticity) against moisture permeation from the outside; heat resistance under a battery operation temperature; and the like. For example, there can be used acrylic resin, urethane resin, epoxy resin, polyethylene resin, polypropylene resin, polyimide resin, a rubber (ethylene-propylene-diene rubber; EPDM) etc. Additionally, an isocyanate-based adhesive, an acrylic resin-based adhesive, a cyanoacrylate adhesive and the like are also usable, and it is further possible to use a hot melt adhesive (urethane resin, polyamide resin, polyolefin resin) etc. Among these examples, polyethylene resin and polypropylene resin are preferably used as a constituent material for the insulating layer from the viewpoint of corrosion resistance, ease of film formation (film formability), economy and the like. It is further preferable to use a resin where amorphous propylene resin as a primary component is copolymerized with ethylene, propylene or butene.

[Exterior Member for Battery]

As an exterior member for battery, it is possible to use a metal can casing as has conventionally been known, and additionally it is also possible to use a bag-like casing formed of a laminated film containing aluminium which casing is capable of housing an electric generator element. As the laminated film, it is possible to employ a laminated film having a three-layer structure in which polypropylene, aluminium and nylon are laminated in this order, for example; however, the laminated film is not particularly limited to those. In this embodiment, a laminated film that is excellent in high output power and cooling performance and can be suitably used as a battery for large devices such as EV and HEV is preferable.

[External Constitution of Bipolar Lithium-Ion Secondary Battery]

Figure 5:
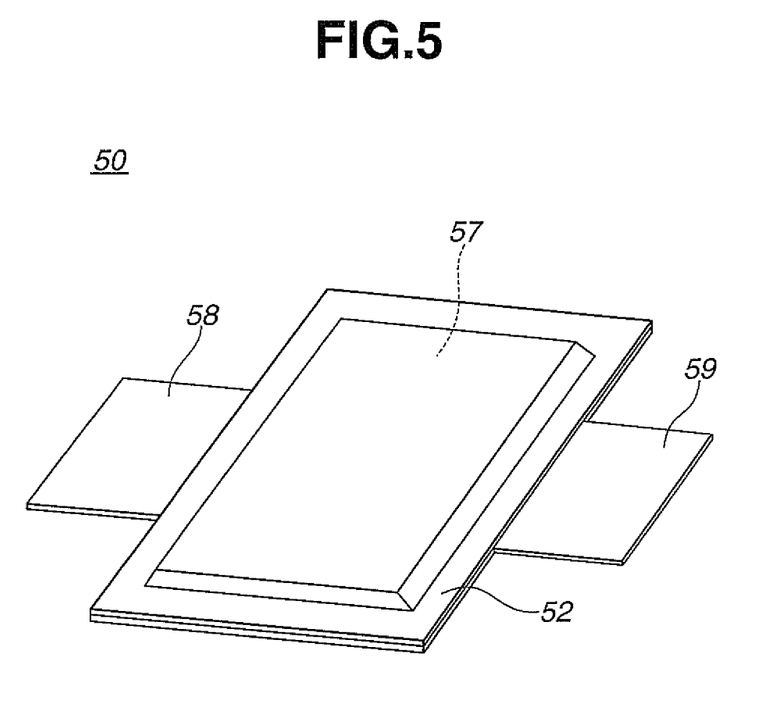
FIG. 5 is a perspective view showing an appearance of a flat lithium-ion secondary battery serving as a first embodiment of a bipolar lithium-ion secondary battery.

FIG. 5 is a perspective view showing an appearance of a flat lithium-ion secondary battery serving as a representative embodiment of a secondary battery.

As shown in FIG. 5, flat lithium-ion secondary battery 50 has a rectangular flat shape where positive electrode tab 58 and negative electrode tab 59 are pulled out from the both side portions. Electric generator element 57 is encased in battery external member 52 for lithium-ion secondary battery 50, and the periphery of which is heat-sealed. Electric generator element 57 is thus hermetically enclosed in a state of projecting positive electrode tab 58 and negative electrode tab 59 outward. By the way, electric generator element 57 corresponds to electric generator element 21 of lithium-ion secondary battery 10 as shown in the aforementioned FIG. 4. Electric generator element 57 is provided to have such a structure as to laminate two or more single cell layers (single cell) 19 that consists of positive electrode (positive electrode active material layer) 13, electrolyte layer 17 and negative electrode (negative electrode active material layer) 15.

The above-mentioned lithium-ion secondary battery is not limited to one of a laminated type having a flat shape. A lithium-ion secondary battery of wound type may have a cylindrical shape or may be one where the cylindrical shape is deformed to be a rectangular flat shape. Thus, the shape is not particularly limited. In the lithium-ion secondary battery having a cylindrical shape, the external member therefor may be a laminated film or a conventional cylindrical can (a metal can). In other words, the external member is not particularly limited. It is preferable that the electric generator element is armored with an aluminium laminated film. With this, weight reduction can be achieved.

Moreover, the state of pulling positive electrode tab 58 and negative electrode tab 59 outward as shown in FIG. 5 is also not particularly limited. Positive electrode tab 58 and negative electrode tab 59 may be pulled outward from the same side, or positive electrode tab 58 and negative electrode tab 59 each may be divided into two or more tabs pulled outward from each side. Thus the state of the tabs is not limited to that as shown in FIG. 5. Furthermore, in the lithium-ion secondary battery of wound type, the tabs may be substituted with terminals formed by utilizing a cylindrical can (a metal can), for example.

[Assembled Battery]

An assembled battery is provided by connecting two or more batteries, and more specifically, provided consisting of two or more batteries connected either in series or in parallel or both. By arranging the batteries in series or in parallel, it becomes possible to arbitrarily adjust capacity and voltage.

It is also possible to constitute a detachable compact assembled battery by connecting two or more batteries in series or in parallel. Furthermore, it is possible to connect two or more of the detachable compact assembled batteries in series or in parallel to constitute an assembled battery having high capacity and high output power suitable as a driving power source and auxiliary power source in which high capacity energy density and high capacity output density are desired. How many batteries are connected to produce an assembled battery and how many compact assembled batteries are laminated to produce a high-capacity assembled battery may be determined according to the battery capacity and output power of a vehicle (an electric vehicle) in which this assembled battery is to be installed.

[Vehicle]

The above-mentioned electric device is excellent in output characteristics and good in cycle property while keeping a discharging capacity even after long-term use. When the electric device is used for an electric vehicle, a hybrid electric vehicle, a fuel cell vehicle and a fuel cell hybrid vehicle or the like, the electric device is required to have higher capacity, larger size and longer life as compared with an electric device for use in electric equipment and mobile electronic equipment. Therefore, the bipolar lithium-ion secondary battery can suitably be used as a power source for vehicle, for example, as a driving power source or auxiliary power source.

More specifically, it is possible to mount a battery or an assembled battery produced by connecting two or more batteries on a vehicle. According to the present invention, a long-life battery excellent in long-term reliability and output characteristics can be established, so that it is possible to constitute a plug-in hybrid electric vehicle with a long driving range and an electric vehicle with a long driving range per charge by providing these vehicles with such a battery. This is because, if a battery or an assembled battery produced by connecting two or more batteries is used for automotive vehicles such as a hybrid vehicle, a fuel cell vehicle and an electric vehicle (any of the above includes four-wheel vehicles such as a passenger vehicle, a commercial vehicle e.g. a truck and a bus, a small vehicle and the like, two-wheel vehicles such as a bike, and three-wheel vehicles), the automotive vehicle becomes a long-life and highly reliable one. However, since the intended use thereof is not limited to vehicles, the battery and the assembled battery are applicable as various power sources for other mobile vehicles such as an electric train and additionally applicable as power sources for mounting, such as an uninterruptible power supply.

EXAMPLES

Example 1

1. Production of Bipolar Electrode

By mixing 85 parts by weight of $LiMn_2O_4$ as a positive electrode active material, 5 parts by weight of acetylene black as an electric conducting additive, 10 parts by weight of polyvinylidene fluoride (PVDF) as a binder and a suitable amount of N-methyl-2-pyrrolidone (NMP) as a slurry viscosity adjusting solvent, a positive electrode active material slurry was prepared.

The positive electrode active material slurry was applied onto one side of a resinous collector (a film in which 10 mass % of acetylene black serving as an electrically conductive carbon is dispersed in 100 mass % of an epoxy resin, having a thickness of 50 μm, having a volume resistance ratio to a positive electrode active material layer (a volume resistance ratio of the positive electrode active material layer to the collector) of 0.025, and a volume resistance ratio to a negative electrode active material layer (a volume resistance ratio of the negative electrode active material layer to the collector) of 0.005) and then dried, thereby obtaining a positive electrode. The positive electrode was subjected to press so that the one side has a thickness of 36 μm.

Subsequently, 90 parts by weight of hard carbon as a negative electrode active material, 10 parts by weight of PVDF as a binder and a suitable amount of NMP as a slurry viscosity adjusting solvent were mixed thereby preparing a negative electrode active material slurry.

The negative electrode active material slurry was applied onto the other side (the side on which the positive electrode active material layer was not formed) of the resinous collector and then dried, thereby forming a negative electrode. The negative electrode was subjected to press so that the one side has a thickness of 30 μm. With this, there was obtained a laminate where an electrically conductive polymer film serving as a collector is coated with the positive electrode on one side while and coated with the negative electrode on the other side.

The laminate was cut into a 140 mm×90 mm square including a 10 mm of sealing space to which both of the positive and negative electrodes were previously not applied, thereby producing a laminate including a 120 mm×70 mm square of electrode surrounded by the 10 mm of sealing space.

Thereafter, the positive electrode active material layer of the laminate was subjected to Al sputtering to form an Al thin layer of 2 nm thickness on the surface of the positive electrode thereby obtaining a bipolar electrode.

2. Production of Bipolar Lithium-Ion Secondary Battery

A lithium salt $LiPF_6$ was dissolved into an equivalent volume mixture of polypropylene carbonate and ethylene carbonate at a concentration of 1 mol/L thereby preparing an electrolyte solution (ion conductivity of the electrolyte solution: 5 ms/cm).

In the above-mentioned bipolar electrode, a 12 mm width PE film was placed on the periphery of the portion to which the electrode was substantially applied, so as to behave as a sealing member. Six layers of the bipolar electrode were laminated through separators (formed of polyethylene and having a thickness of 30 μm) and then pressed from both upward and downward directions to be heat-sealed at its seal portion, thereby sealing each of the layers. After the sealing operation on the third side was achieved, the electrolyte solution was poured thereinto, followed by sealing the last side.

There were manufactured strong electric terminals each of which is in the form of a 130 mm×80 mm, 100 μm thickness aluminium plate, capable of covering all over the projection of the bipolar battery element and includes a section that extends outward from the projection. The bipolar battery element was sandwiched between the terminals and then vacuum-sealed with an aluminium laminate in such a manner as to cover them. Both sides of the entire of the bipolar battery element were pressed at atmospheric pressure thereby completing a bipolar battery.

Example 2

The procedures of Example 1 were repeated with the exception that an Al thin layer (a current distribution relaxation layer) was formed on the surface of the positive electrode active material layer by spattering to have a thickness of 5 μm, thereby producing a bipolar battery.

Example 3

The procedures of Example 1 were repeated with the exception that a current distribution relaxation layer was formed on the surface of the positive electrode active material layer by using an Al mesh foil (having a lattice size of 3 mm×3 mm and a thickness of 5 μm), thereby producing a bipolar battery.

Example 4

The procedures of Example 1 were repeated with the exception that a current distribution relaxation layer was formed on the surface of the positive electrode active material layer by using an Al mesh foil (having a lattice size of 3 mm×3 mm and a thickness of 10 μm), thereby producing a bipolar battery.

Example 5

The procedures of Example 1 were repeated with the exception that 70 parts by weight of acetylene black, 30 parts by weight of PVDF and a suitable amount of NMP as a slurry viscosity adjusting solvent were mixed to produce a slurry and that the slurry was applied onto the positive electrode active material layer and then dried to form a current distribution relaxation layer (having a thickness of 10 μm), thereby producing a bipolar battery.

Example 6

The procedures of Example 1 were repeated with the exception that 80 parts by weight of acetylene black, 20 parts by weight of PVDF and a suitable amount of NMP as a slurry viscosity adjusting solvent were mixed to produce a slurry and that the slurry was applied onto the positive electrode active material layer and then dried to form a current distribution relaxation layer (having a thickness of 10 μm), thereby producing a bipolar battery.

Example 7

The procedures of Example 1 were repeated with the exception that 90 parts by weight of acetylene black, 10 parts by weight of PVDF and a suitable amount of NMP as a slurry viscosity adjusting solvent were mixed to produce a slurry and that the slurry was applied onto the positive electrode active material layer and then dried to form a current distribution relaxation layer (having a thickness of 10 μm), thereby producing a bipolar battery.

Example 8

The procedures of Example 1 were repeated with the exception that 90 parts by weight of acetylene black, 10 parts by weight of PVDF and a suitable amount of NMP as a slurry viscosity adjusting solvent were mixed to produce a slurry and that the slurry was applied onto the negative electrode active material layer and then dried to form a current distribution relaxation layer (having a thickness of 10 μm), thereby producing a bipolar battery.

In any of the above examples, the volume resistivity of the current distribution relaxation layer was lower than the volume resistivity of the positive electrode active material layer. The ratios of the volume resistivity of the current distribution relaxation layer to the volume resistivity of the active material layer were $5.9 \times 10^{-6}$ (Example 1), $5.9 \times 10^{-5}$ (Example 2), $2.3 \times 10^{-3}$ (Example 3), $2.4 \times 10^{-3}$ (Example 4), $3.2 \times 10^{-3}$ (Example 5), $2.4 \times 10^{-3}$ (Example 6), $2.0 \times 10^{-3}$ (Example 7) and $2.0 \times 10^{-3}$ (Example 8). Furthermore, the electron conductivities of the current distribution relaxation layer were $3 \times 10^{-6}$ s/cm (Example 1), $3 \times 10^{-6}$ s/cm (Example 2), $1.2 \times 10^{-3}$ s/cm (Example 3), $1.2 \times 10^{-3}$ s/cm (Example 4), $1.5 \times 10^{-3}$ s/cm (Example 5), $1.2 \times 10^{-3}$ s/cm (Example 6), $1.0 \times 10^{-3}$ s/cm (Example 7) and $1.0 \times 10^{-3}$ s/cm (Example 8).

Comparative Example 1

The procedures of Example 1 were repeated with the exception that a current distribution relaxation layer was not provided, thereby producing a bipolar battery.

[Evaluation]

A charging and discharging test was conducted on each battery of Examples 1 to 7 and Comparative Example 1. In this test, the batteries were charged with a constant current (CC) of 0.5 mA until 21.0 V and then charged at a constant voltage (CV). The total charging time was 10 hours. After that, the capacity was measured at a discharging capacity of 1C. The above procedures were repeated 300 times. The ratio of the discharging capacity of after certain cycles to the first cycle of the repeated cycles was obtained as a capacity maintenance ratio (%). The results are shown in Table 1.

|  | Capacity Maintenance Ratio [%] |
| --- | --- |
| Example 1 | 80 |
| Example 2 | 84 |
| Example 3 | 75 |
| Example 4 | 79 |
| Example 5 | 80 |
| Example 6 | 84 |
| Example 7 | 89 |
| Example 8 | 85 |
| Comparative Example 1 | 65 |

From the results of the capacity maintenance ratio of Examples to that of the Comparative Example, it is found that durability is improved by providing the current distribution relaxation layer. Additionally, when Examples 7 and 8 are compared, it is found that the capacity maintenance ratio is further improved by disposing the current distribution relaxation layer on the side of the positive electrode active material layer.

The invention claimed is:

1. A bipolar electrode consisting essentially of:
   a collector;
   a positive electrode active material layer disposed on one surface of the collector, the positive electrode active material layer comprising a positive electrode active material having an average particle diameter from 1 μm to 100 μm, the positive electrode active material layer comprising a lithium-cobalt composite oxide, a lithium-nickel composite oxide, a lithium-manganese composite oxide, or a lithium-iron composite oxide;
   a negative electrode active material layer disposed on another surface of the collector, wherein a ratio of a volume resistivity in thickness direction of the collector to that in thickness direction of the positive or negative electrode active material layer is between $10^{-3}$ and $10^4$; and
   current distribution relaxation layer disposed only on a side of the positive electrode active material layer and having a volume resistivity lower than that of the positive electrode active material layer,
   wherein the positive electrode active material layer is disposed between the current distribution relaxation layer and the collector, and
   wherein the collector is a resinous collector having an electrical conductivity, and the volume resistivity of the collector is $1\times10^{-7}$ to $1\times10^2$ Ω·cm.

2. A bipolar electrode as claimed in claim 1, wherein the current distribution relaxation layer is an outermost layer of the bipolar electrode.

3. A bipolar lithium-ion secondary battery comprising:
   an electric generator element in which the bipolar electrode as claimed in claim 1 and an electrolyte layer are alternately laminated.

4. The bipolar lithium-ion secondary battery as claimed in claim 3, wherein the current distribution relaxation layer has an electron conductivity higher than an ion conductivity of an electrolyte contained in the electrolyte layer.

5. The bipolar electrode as claimed in claim 1, wherein the current distribution relaxation layer comprises a thin metal layer having a thickness of 1 to 1000 nm.

6. The bipolar electrode as claimed in claim 1, wherein the resinous collector is formed of a non-conductive polymer material to which an electrically conductive filler is added.

7. The bipolar electrode as claimed in claim 1, wherein the current distribution relaxation layer comprises a metal foil having a mesh structure.

8. The bipolar electrode as claimed in claim 1, wherein the current distribution relaxation layer comprises an electrically conductive filler and a binder.

9. The bipolar electrode as claimed in claim 1, wherein the current distribution relaxation layer is one or more selected from the group consisting of aluminum, nickel, iron, stainless steel, titanium, copper, gold, silver and alloys thereof.

* * * * *